July 16, 1957  R. BINDER  2,799,376
AUTOMATIC CENTRIFUGAL CLUTCH
Filed April 5, 1956
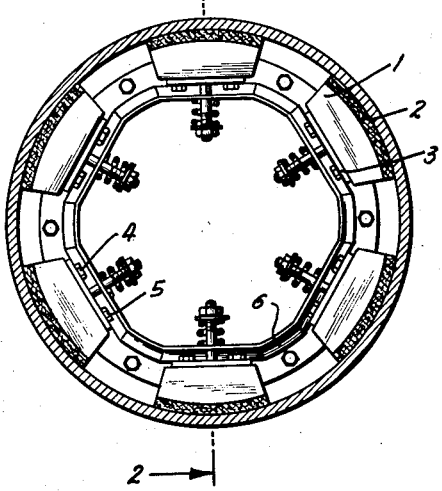
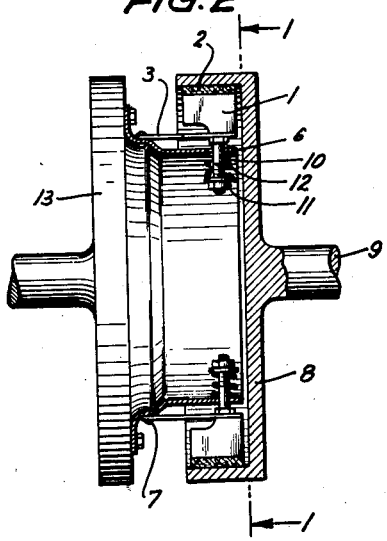
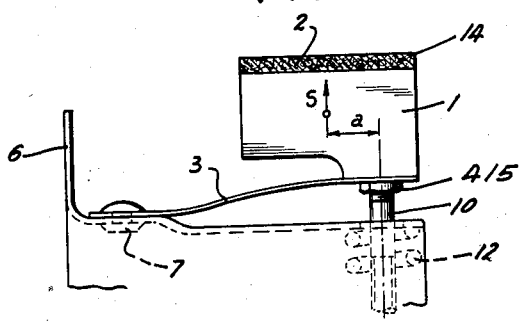
INVENTOR
Richard Binder
by:
Michael S. Striker
agt.

United States Patent Office 2,799,376
Patented July 16, 1957

2,799,376

AUTOMATIC CENTRIFUGAL CLUTCH

Richard Binder, Schweinfurt, Germany, assignor to Firma Fichtel & Sachs A. G., Schweinfurt (Main), Germany Application April 5, 1956, Serial No. 576,404

Claims priority, application Germany April 7, 1955

1 Claim. (Cl. 192—105)

The present invention relates to clutches.

More particuluarly, the present invention relates to automatic centrifugal clutches.

One of the objects of the present invention is to provide an automatic centrifugal clutch wherein flyweights engage a driven member at all times with forces which are perfectly proportional to the speed of rotation of the driving member.

Another object of the present invention is to provide an automatic centrifugal clutch wherein the engagement between the flyweights and the driven clutch member is completely uninfluenced by the structure which carries the flyweights.

A further object of the present invention is to provide an automatic centrifugal clutch with a means for transmitting motion between the driving and driven members with absolutely no play in the motion transmitting means.

An additional object of the present invention is to provide an automatic centrifugal clutch wherein the flyweights will not tilt during their movement inwardly and outwardly away from the axis of the clutch.

Also, it is an object of the present invention to provide a centrifugal clutch arrangement capable of accomplishing all of the above objects and at the same time composed of simple and ruggedly constructed elements which are very reliable in operation.

With the above objects in view the present invention mainly consists of an automatic centrifugal clutch which includes a drive means having an axis of rotation and a plurality of leaf springs respectively fixed at end portions thereof to the drive means for rotation therewith. All of the leaf springs extend in the same direction from the fixed end portions thereof and the leaf springs are substantially parallel to the axis of rotation and are distributed about the same. A plurality of flyweights are connected to the leaf springs at the free portions thereof and at the sides of the leaf springs which are directed away from the axis of rotation of the drive means. A driven means is coaxial with the drive means and is provided with an inwardly directed annular surface surrounding the flyweights so that when the speed of rotation of the drive means increases the flyweights will automatically move outwardly away from the axis of rotation of the drive means to place the latter in driving engagement with the driven means by engagement with the annular surface of the latter.

The novel features which are considered as characteristic for the inventon are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a transverse sectional view of one possible embodiment of an automatic centrifugal clutch according to the present invention, the section of Fig. 1 being taken along 1—1 of Fig. 2 in the direction of the arrows;

Fig. 2 is a side elevational sectional view of the clutch of Fig. 1, Fig. 2 being taken along line 2—2 of Fig. 1 in the direction of the arrows; and Fig. 3 is a side elevational view illustrating the manner in which the flyweights of the clutch of the invention are connected to leaf springs of the clutch of the invention.

Referring now to the drawings, it will be seen that the automatic centrifugal clutch illustrated therein includes a plurality of flyweights 1 which are respectively affixed to free end portions of leaf springs 3 as by threaded pins fixed to each flyweight 1, extending respectively through openings of each leaf spring 3, and carrying the nuts 4 and 5 which thus serve to fix the flyweights 1 respectively to the leaf springs 3. The flyweights 1 may include at their outer faces which respectively form parts of a cylinder coverings 2 of a material having a high coefficient of friction, such as a brake lining material, this latter material being fixed to and forming part of the flyweights 1.

The elongated leaf springs 3 are fixed at their left end portions, as viewed in Figs. 2 and 3, to an elongated hollow member 6 which forms part of a drive means by means of rivets 7, for example. It will be noted that the elongated hollow member 6 is provided with a shoulder at the region where the rivets 7 fix the leaf springs 3 to the hollow member 6, the portions of the hollow member 6 which extends to the right of this shoulder, as viewed in Figs. 2 and 3, being of a smaller diameter than the shoulder so that the leaf springs 3 have elongated free portions which are parallel to the axis of the hollow member 6.

The drive means includes in addition to the hollow member 6 a drive shaft coaxial with the latter and fixed to a disk 13 to which the left end of the hollow member 6 is removably connected as by being screwed thereto in the manner shown most clearly in Fig. 2, the hollow member 6 having at its left end, as viewed in Fig. 2, an outwardly extending annular flange formed with openings through which the screw member extend to fix the hollow member 6 to the disk 13. When the automatic clutch of the invention is used in an automobile, for example, then the disk 13 is the flywheel of the engine of the automobile. It will be noted that the hollow member 6, in the illustrated example, has flat side portions and is of a substantially hexagonal configuration, as is illustrated most clearly in Fig. 1.

Adjacent its right end portion, as viewed in Fig. 2, the hollow member 6 is formed with a plurality of openings located in a plane normal to the axis of rotation of the drive means constituted by the hollow member 6 and the disk 13 and shaft fixed to the latter, and a plurality of pins 10 extend with clearance through these openings inwardly toward the axis of the hollow member 6, these pins 10 also extending respectively through openings of the leaf springs 3 and being fixedly connected to the flyweights 1, as by being threaded into threaded bores of the latter, for example. The pins 10 threadedly carry at their end portions within the hollow member 6 a plurality of nuts 11, respectively, and these nuts engage washers which in turn engage a plurality of coil springs 12 which are respectively coiled about the pins 10 and which engage the inner face of the hollow member 6 at their outer ends, respectively. Thus, the springs 12 form a plurality of spring means together with elements 10 and 11 which urge the flyweights 1 inwardly toward the axis of rotation of the drive means, and by turning the nuts 11 it is possible to adjust the stress of the springs 12.

The above described structure cooperates with a driven means which includes a driven shaft 9 fixed to a disk 8 which in turn has fixed to its outer periphery an axially extending cylindrical portion having an inwardly directed annular surface which surrounds the flyweights 1 in the manner shown in Figs. 1 and 2, so that when the speed of rotation of the drive means increases the flyweights 1 will move outwardly away from the axis of rotation to engage the inwardly directed annular surface of the driven means, constituted by elements 8 and 9, this driven means having an axis of rotation coincident with that of the drive means.

The above described structure operates as follows:

When the clutch is not operating the flyweights 1 are out of engagement with the driven means. Also, when the drive means is rotating at a low rate of speed, as when the engine is idling, the springs 12 have a force sufficient to prevent the flyweights 1 from moving outwardly as a result of the centrifugal force acting on these flyweights during the rotation of the drive means at relatively low speeds. Thus, at this time the flyweights 1 do not engage the driven means with their outer portions 2 and the clutch is entirely disengaged. As the speed of rotation of the drive means increases, the centrifugal force also increases and overcomes the force of the springs 12 to compress the latter so that the flyweights 1 apply their outer coverings 2 gradually against the inner annular surface of the drum 8 of the driven means, and as the speed of rotation continues to increase the slip of the flyweights with respect to the driven means decreases and the driven means is taken along with the drive means to an increasing extent until no further slippage occurs and the clutch is fully engaged.

It is a characteristic of the structure of the present invention that the force with which the flyweights engage the driven means is at all times exactly proportional to the speed of rotation of the drive means. Inasmuch as the leaf springs 3 extend in a direction parallel to the axis of the clutch while the flyweights move in substantially radial directions, respectively, perpendicularly to the axis of the clutch, the leaf springs 3 can have absolutely no influence on the pressure between the flyweights and the driven means. This arrangement is in sharp contrast to conventional arrangements where the movement of the linkages connected to the flyweights increases or decreases the force with which the flyweights engage the driven means simply because of the change in the positions of these linkages and because of the resulting changes in the moment arms acting on the flyweights. Thus, with conventional arrangements there is a type of servo-action which causes the flyweights once they engage the driven means to engage the latter with an increasing force or a decreasing force resulting not from a change in the speed of rotation of the drive means but only from a change in the positions of the linkages connected to the flyweights. This servo-action is completely avoided with the structure of the invention, and furthermore the flyweights are connected to the leaf springs in such a way that there can be absolutely no frictional rubbing between the flyweights and the structure which carries the same, so that the clutch of the invention is extremely sensitive and responds to the slightest change in the speed of rotation of the drive means in order to provide a corresponding change in the pressure with which the flyweights engage the driven means.

With the structure of the invention the pins 10 have a relatively large clearance in the openings of the hollow member 6 through which they respectively extend, so that these pins 10 never engage the edges of the openings, and as a result the transmission of the drive from the drive means to the flyweights when the latter are in driving engagement with the driven means takes place exclusively through the leaf springs 3 which because of their arrangement in the assembly are very strong and are capable of resisting the forces which they absorb in order to transmit the drive. In other words, with the arrangement shown the stresses in the leaf springs 3 resulting from the transmission of the drive through these leaf springs tends to shear the leaf spring transversely across their length, and the leaf springs are very strong in this direction so that they efficiently transmit the drive with very little yieldability, and furthermore it will be noted that with the disclosed structure there is absolutely no play in the drive transmitting structure because there are absolutely no elements such as pivotally interconnected links which would have a play at their pivotal connections. A further advantage of the above described structure resides in the fact that the flyweights operate perfectly even if there are inaccuracies in the positions of the flyweights when the clutch is disengaged resulting from inaccuracies in the manufacture of the parts, such inaccuracies being compensated simply by slight distortion of the leaf springs.

As is indicated in Fig. 3, the flyweights 1 have centers of gravity S. If the flyweights were connected respectively to the leaf springs in a plane which passed through the centers of gravity S of the flyweights, then when the flyweights moved outwardly from the axis of the clutch during an increase of the speed of rotation of the drive means, the flyweights would tilt and their edges 14, shown in Fig. 3, would first engage the inner annular surface of the drum 8, so that there would not be a uniform engagement of the flyweights over their entire outer surfaces at all times. In order to avoid this undersirable result, the flyweights are connected to the leaf springs in a plane which is spaced by the distance $a$ indicated in Fig. 3 beyond the centers of gravity of the flyweights, these centers of gravity being located between the plane of connection of the flyweights to the leaf springs and the plane of connection of the leaf springs to the hollow member 6 by the rivets 7. With this arrangement as the flyweights move outwardly from the axis of the clutch and turn with the leaf springs in a counterclockwise direction, as viewed in Fig. 3, the flyweights themselves, because of the position of their centers of gravity, act with the moment arms $a$ in a clockwise direction to counteract such tilting of the flyweights, and thus tilting of the flyweights in the above described undesirable manner is completely avoided or substantially reduced.

It is possible with the structure of the invention to control very accurately the manner in which the clutch becomes engaged and disengaged. Thus, by varying the stress of some of the springs 12 by proper positioning of the nuts 11 it is possible to cause part of the flyweights to engage the driven means before the remainder of the flyweights so that a very gradual engagement of the clutch can be produced. When such an arrangement is used, the group of flyweights which first engage the driven means are uniformly distributed about the axis of the clutch. For example, the springs 12 cooperating with a pair of diametrically opposed flyweights or with a larger number of uniformly distributed flyweights may have a lesser compression by suitable adjustment of the nuts 11 than the remainder of the springs 12 so that the group of flyweights acted on by the springs of lesser compression engage the driven means before the other flyweights. It is also possible to produce the same result by providing a group of uniformly distributed flyweights with equal masses smaller than the masses of the remainder of the flyweights, and here again the group of flyweights of smaller mass may be a pair of diametrically opposed flyweights or any larger number of flyweights which are uniformly distributed about the axis of the clutch. With such an arrangement the flyweights of smaller mass may have the springs 12 cooperating therewith provided with a substantially smaller compression than the springs associated with the flyweigths of larger mass, so that the flyweights of smaller mass will first engage the driven means, and in this way an extremely smooth gradual engagement of the clutch will be provided, because the flyweights of heavier mass do not engage the driven means until after the latter is engaged by the lightest flyweights.

When the above described clutch of the invention is used in an automobile, for example, it is preferred to use this clutch in connection with a conventional clutch which may be engaged and disengaged at will by the operator.

It will be noted that with the above described structure of the invention not only do the flyweights always engage the driven means with a pressure exactly proportional to the speed of rotation of the drive means, and not only is there absolutely no play in the transmission of motion through the leaf springs 3, but in addition there are absolutely no parts which slide or turn with respect to each other so as to become worn and produce an undesirable play after a period of use. Such undesirable wearing of moving parts and the resultant play developing from such wearing is also completely avoided with the structure of the invention.

The hollow member 6 of the drive means is preferably formed from drawn sheet metal and may be made of steel, for example. Furthermore, it will be noted that the leaf springs 3 as well as the flyweights 1 and elements 10—12 associated therewith are all carried by and form a unit with the hollow member 6. Therefore this hollow member 6 together with elements 1—3 and 10—12 form a unit and provide a convenient subassembly which is separately manufactured and which is assembled as a unit with the flywheel or disk 13, so that the assembly and disassembly as well as the manufacture of the clutch of the invention is not very costly and can be very quickly and easily carried out. In assemblying the structure of the invention the unit composed of elements 1—3, 6, and 10—12 is simply connected to the disk 13 by the screw members which are shown in Figs. 1 and 2.

It will be understood that each of the elements described above, or two or more together, may also find a useful application in other types of clutches differing from the types described above.

While the invention has been illustrated and described as embodied in automatic centrifugal clutches, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

In an automatic centrifugal clutch, in combination, drive means having an axis of rotation and including an elongated hollow member coaxial with said axis, said hollow member having an annular wall portion formed with a plurality of openings located in a plane normal to said axis; a plurality of leaf springs respectively fixed at end portions thereof to said hollow member and respectively having elongated free portions extending in the same direction from said end portions, being substantially parallel to said axis, and respectively extending over said openings; a plurality of flyweights respectively fixed to said leaf springs at said free elongated portions thereof; a plurality of pins respectively fixed to said flyweights and respectively extending with clearance through said openings of said hollow member toward said axis; and a plurality of spring means located within said hollow member and connected operatively to said pins for urging said flyweights inwardly toward said axis.

References Cited in the file of this patent

UNITED STATES PATENTS

| | | |
|---|---|---|
| 1,733,703 | Uggla et al. | Oct. 29, 1929 |
| 1,819,829 | Wersall | Aug. 18, 1931 |
| 2,376,665 | Cross | May 22, 1945 |
| 2,504,177 | Bruestle | Apr. 18, 1950 |